United States Patent
Abbott et al.

(10) Patent No.: US 10,081,342 B2
(45) Date of Patent: Sep. 25, 2018

(54) SYSTEMS AND METHODS FOR BRAKE ACTUATOR OPERATION UNDER LOAD CELL FAILURE

(71) Applicant: Goodrich Corporation, Charlotte, NC (US)

(72) Inventors: Michael Abbott, Shelburne, VT (US); Richard A. Poisson, Avon, CT (US)

(73) Assignee: Goodrich Corporation, Charlotte, NC (US)

( * ) Notice: Subject to any disclaimer, the term of this patent is extended or adjusted under 35 U.S.C. 154(b) by 295 days.

(21) Appl. No.: 14/720,482

(22) Filed: May 22, 2015

(65) Prior Publication Data

US 2016/0339881 A1 Nov. 24, 2016

(51) Int. Cl.
*B60T 8/17* (2006.01)
*B64C 25/44* (2006.01)
*B60T 8/171* (2006.01)
*B64C 25/42* (2006.01)

(52) U.S. Cl.
CPC ............ *B60T 8/1703* (2013.01); *B60T 8/171* (2013.01); *B64C 25/44* (2013.01); *B64C 25/42* (2013.01)

(58) Field of Classification Search
None
See application file for complete search history.

(56) References Cited

U.S. PATENT DOCUMENTS

| | | | |
|---|---|---|---|
| 6,296,325 B1 * | 10/2001 | Corio | B60T 8/1703 244/110 A |
| 6,402,259 B2 | 6/2002 | Corio | |
| 6,471,015 B1 * | 10/2002 | Ralea | B60T 8/1703 188/1.11 L |
| 8,550,572 B2 | 10/2013 | Summers | |
| 2008/0258547 A1 | 10/2008 | Ralea | |
| 2009/0276133 A1 * | 11/2009 | May | B60T 7/042 701/75 |
| 2011/0118914 A1 * | 5/2011 | Brooks | B61L 3/006 701/20 |
| 2013/0175403 A1 * | 7/2013 | Spray | B60T 8/1703 244/235 |
| 2017/0110997 A1 * | 4/2017 | Krucinski | H02P 1/423 |

FOREIGN PATENT DOCUMENTS

| | | |
|---|---|---|
| DE | 19652230 | 6/1998 |
| EP | 2570317 | 3/2013 |
| GB | 2469703 | 10/2010 |

OTHER PUBLICATIONS

Extended European Search Report dated Nov. 2, 2016 in European Application No. 16170360.8.

* cited by examiner

Primary Examiner — Nicholas K Wiltey
(74) Attorney, Agent, or Firm — Snell & Wilmer L.L.P.

(57) ABSTRACT

The present disclosure provides systems and methods for multiple brake actuator operation under load cell failure. In various embodiments, a system for multiple brake actuator operation comprises a controller, a load cell in communication with the controller, a current sensor in communication with the controller, and a position sensor in communication with the controller and configured to measure a rotational speed of a motor shaft.

20 Claims, 4 Drawing Sheets

SYSTEMS AND METHODS FOR BRAKE ACTUATOR OPERATION UNDER LOAD CELL FAILURE

FIELD

The present disclosure relates to aircraft braking systems, and more specifically, to systems and methods for control over a plurality of electro-mechanical actuators with at least one load cell.

BACKGROUND

Typically, an aircraft may comprise four electro-mechanical brake actuators (EBA) that are configured to apply force to a brake stack on an aircraft wheel. A load cell may be coupled to the EBA in order to provide feedback in regards to the amount of force that the EBA is applying to the brake stack. A high level command, such as brake pedal deflection from the cockpit, for example, may send a signal to an electro-mechanical brake actuator controller (EBAC), which in turn gets sent to the EBA, which in turn applies a force on the brake stack in order to decrease the radial velocity of the wheel. During an event where a load cell fails, the EBA may lose the ability to be controlled in a closed loop manner.

SUMMARY

In various embodiments, the present disclosure provides systems and methods for multiple brake actuator operation under load cell failure. In various embodiments, a system for multiple brake actuator operation comprises a controller, a load cell in communication with the controller, a current sensor in communication with the controller, and a position sensor in communication with the controller and configured to measure a rotational speed of a motor shaft. In various embodiments, the controller may comprise a tangible, non-transitory memory configured to communicate with the controller, the tangible, non-transitory memory having instructions stored thereon that, in response to execution by the controller, cause the controller to perform operations comprising, receiving, by the controller, a motor angular velocity, receiving, by the controller, a load cell force, receiving, by the controller, a command force, calculating, by the controller, an angular velocity according to the command force and the load cell force, calculating, by the controller, a primary command current according to the angular velocity and the motor angular velocity, detecting, by the controller, a load cell failure, and switching, by the controller, from the primary command current to a secondary command current, wherein the secondary command current is derived from a signal blender according to at least one operable load cell command current.

A method of operating multiple brake actuators is described herein according to various embodiments. The method of operating multiple brake actuators may comprise, receiving, by the controller, a command force, receiving, by the controller, a load cell force, receiving, by the controller, a motor angular velocity, calculating, by the controller, an angular velocity according to the command force and the load cell force, calculating, by the controller, a primary command current according to the angular velocity and the motor angular velocity, detecting, by the controller, a load cell failure, and switching, by the controller, from the primary command current to a secondary command current, wherein the secondary command current is derived from a signal blender according to at least one other operable load cell command current.

In various embodiments, a tangible, non-transitory memory configured to communicate with a controller, the tangible, non-transitory memory having instructions stored thereon that, in response to execution by the controller, cause the controller to perform operations comprising, receiving, by the controller, a motor angular velocity, receiving, by the controller, a load cell force, receiving, by the controller, a command force, calculating, by the controller, an angular velocity according to the command force and the load cell force, calculating, by the controller, a primary command current according to the angular velocity and the motor angular velocity, detecting, by the controller, a load cell failure, and switching, by the controller, from the primary command current to a secondary command current, wherein the secondary command current is derived from a signal blender according to at least one operable load cell command current.

In various embodiments, the method may comprise utilizing secondary load cell information during the failure of a primary load cell in order to properly operate a primary electro-mechanical brake actuator.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling").

In various embodiments, systems with feedback control may become inoperable if a sensor which provides the feedback fails. The failure of a single sensor may cause an entire system to fail due to the dependence of other components on the failed sensor. Various systems and methods to address these challenges are presented herein. For instance, a system may be configured to receive data from a secondary operable sensor in the event that the primary sensor fails.

Various embodiments include an aircraft electro-mechanical brake actuator controller (EBAC). The EBAC involves the transmission of power and data across a system of circuits and wires. According to instructions stored thereon, a tangible, non-transitory memory may be configured to communicate with the EBAC.

While described in the context of aircraft applications, and more specifically, in the context of brake control, the various embodiments of the present disclosure may be applied to any suitable application.

Figure 1:
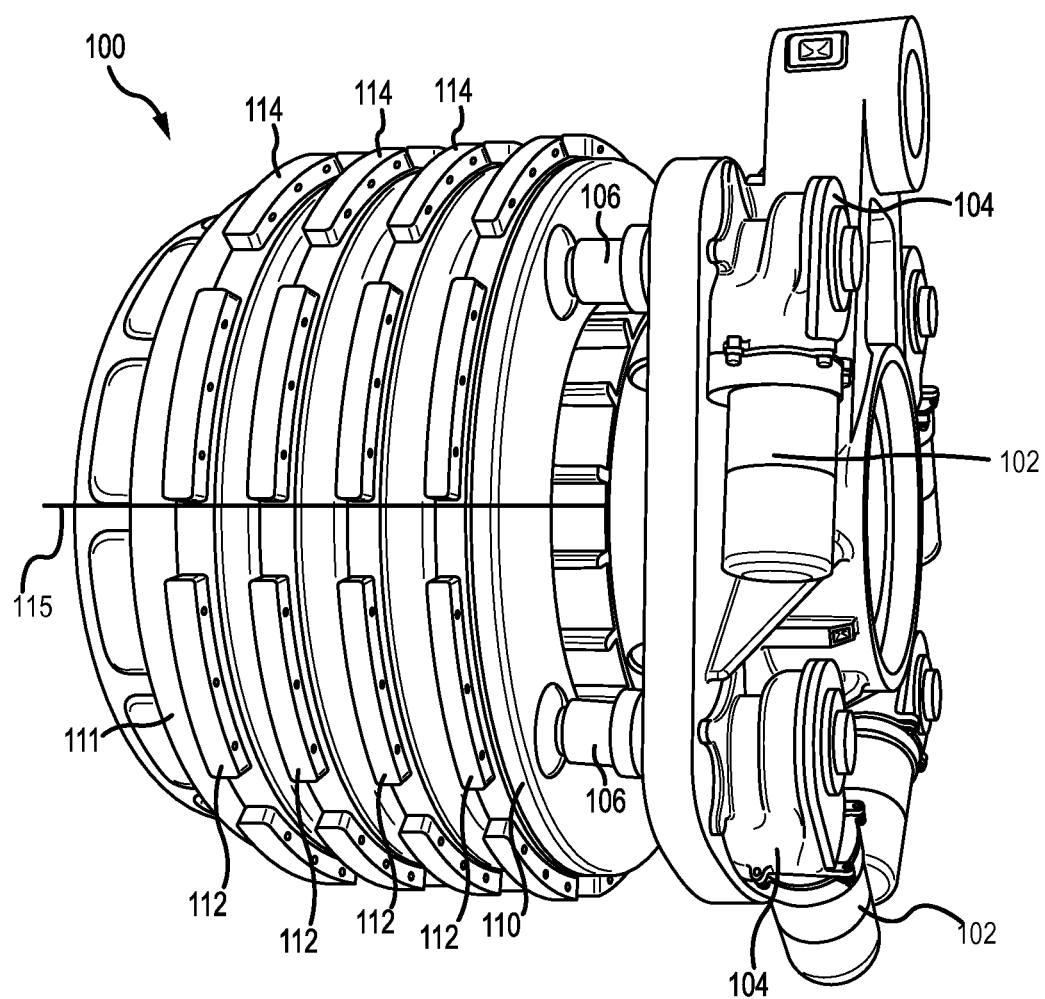
FIG. 1 illustrates an aircraft brake in accordance with various embodiments.

FIG. 1 illustrates an aircraft brake 100 in accordance with various embodiments. Aircraft brake 100 may include a plurality of actuator motors 102, a plurality of electromechanical brake actuators 104, a plurality of ball nuts 106, an end plate 111 and a pressure plate 110, and a plurality of rotating discs 112 and stators 114 positioned in an alternating fashion between end plate 111 and pressure plate 110. Rotating discs 112 may rotate about an axis 115 and the stators 114 may have no angular movement relative to axis 115. Wheels may be coupled to rotating discs 112 such that a linear speed of the aircraft is proportional to the angular speed of rotating discs 112. As force is applied to pressure plate 110 towards end plate 111 along the axis 115, rotating discs 112 and stators 114 are forced together in an axial direction. This causes the rotational speed of rotating discs 112 to become reduced (i.e., causes braking effect) due to friction between rotating discs 112, stators 114, end plate 111 and pressure plate 110. When sufficient force is exerted on rotating discs 112 via pressure plate 110, the rotating discs 112 will stop rotating.

In order to exert this force onto pressure plate 110, actuator motor 102 may cause electromechanical brake actuator 104 to actuate. In various embodiments, actuator motor 102 may be a brushless motor, such as a permanent magnet synchronous motor (PMSM), a permanent-magnet motor (PMM) or the like. In various embodiments, and with reference to FIG. 2, electromechanical brake actuator 104 may be coupled to or otherwise operate a motor shaft 204 and a pressure generating device, such as, for example, a ball screw, a ram, and/or the like. In response to actuation, electromechanical brake actuator 104 causes the motor shaft 204 to rotate. Rotation of the motor shaft 204 may cause rotation of a ball screw 206, and rotational motion of the ball screw 206 may be transformed into linear motion of a ball nut 106. With reference again to FIG. 1, linear translation of ball nut 106 towards pressure plate 110 applies force on pressure plate 110 towards end plate 111.

Electromechanical brake actuator 104 is actuated in response to current being applied to actuator motor 102. The amount of force applied by electromechanical brake actuator 104 is related to the amount of current applied to actuator motor 102. With reference again to FIG. 2, in various embodiments, an electromechanical brake actuator control system 200 may comprise a current sensor 212 to detect an amount of current provided to actuator motor 102. Current sensor 212 may be in communication with actuator motor 102 and/or with various other components of an electromechanical brake actuator 104, an electromechanical brake actuator control system 200, and/or an aircraft. In various embodiments, current sensor 212 may be disposed on or adjacent to actuator motor 102. However, current sensor 212 may be disposed in any location suitable for detection of electrical current supplied to the actuator motor 102.

Application of current to actuator motor 102 causes rotation of motor shaft 204. In various embodiments, electromechanical brake actuator control system 200 may comprise a position sensor 208. Position sensor 208 may be configured so as to measure the rotational speed and position of motor shaft 204. In various embodiments, position sensor 208 may be disposed in or adjacent to electromechanical brake actuator 104, or on or adjacent to actuator motor 102. However, position sensor 208 may be disposed in any location suitable for detection of the rotational speed and position of motor shaft 204. In various embodiments, position sensor 208 may comprise a resolver, tachometer, or the like.

In various embodiments, electromechanical brake actuator control system 200 may comprise a load cell 202. Load cell 202 may be configured so as to measure the amount of force being applied between ball nut 106 and pressure plate 110. In various embodiments, load cell 202 may be disposed in or adjacent to electromechanical brake actuator 104, or on or adjacent to ball nut 106. However, load cell 202 may be disposed in any location suitable for detection of the force being applied between ball nut 106 and pressure plate 110. A controller may receive the detected force and rotational speed, and calculate an adjusted force and an adjusted rotational speed based on those detected values. In various embodiments, electromechanical brake actuator control system 200 may comprise a fault tolerant module 210.

In various embodiments, a system for brake actuator operation with load cell fault tolerant technology comprises four load cells 202 and four position sensors 208 and at least one controller. The system for multiple brake actuator operation via one load cell may comprise a fault tolerant module 210. In various embodiments, fault tolerant module 210 may be a controller and/or processor. In various embodiments, fault tolerant module 210 may be implemented in a single controller and/or processor. In various embodiments, fault tolerant module 210 may be implemented in multiple controllers and/or processors. In various embodiments, fault tolerant module 210 may be implemented in an electromechanical actuator controller and/or a brake control unit.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Figure 2:
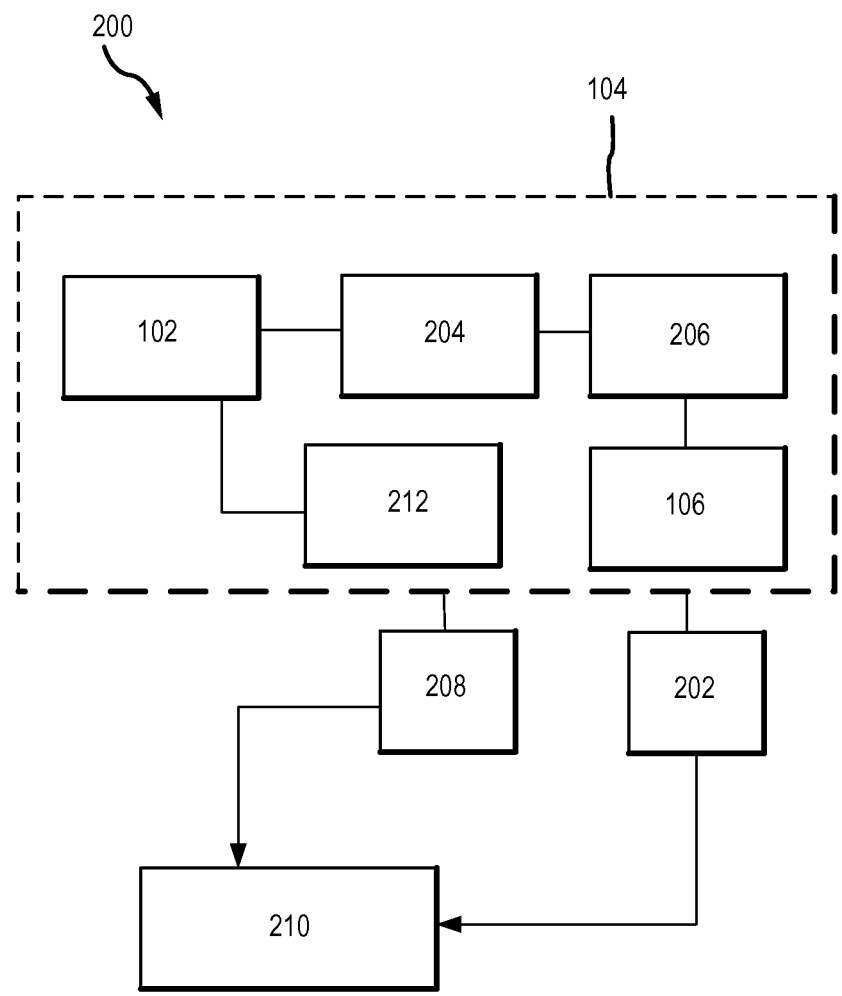
FIG. 2 illustrates a block diagram of an electromechanical brake actuator control system in accordance with various embodiments.
Figure 3:
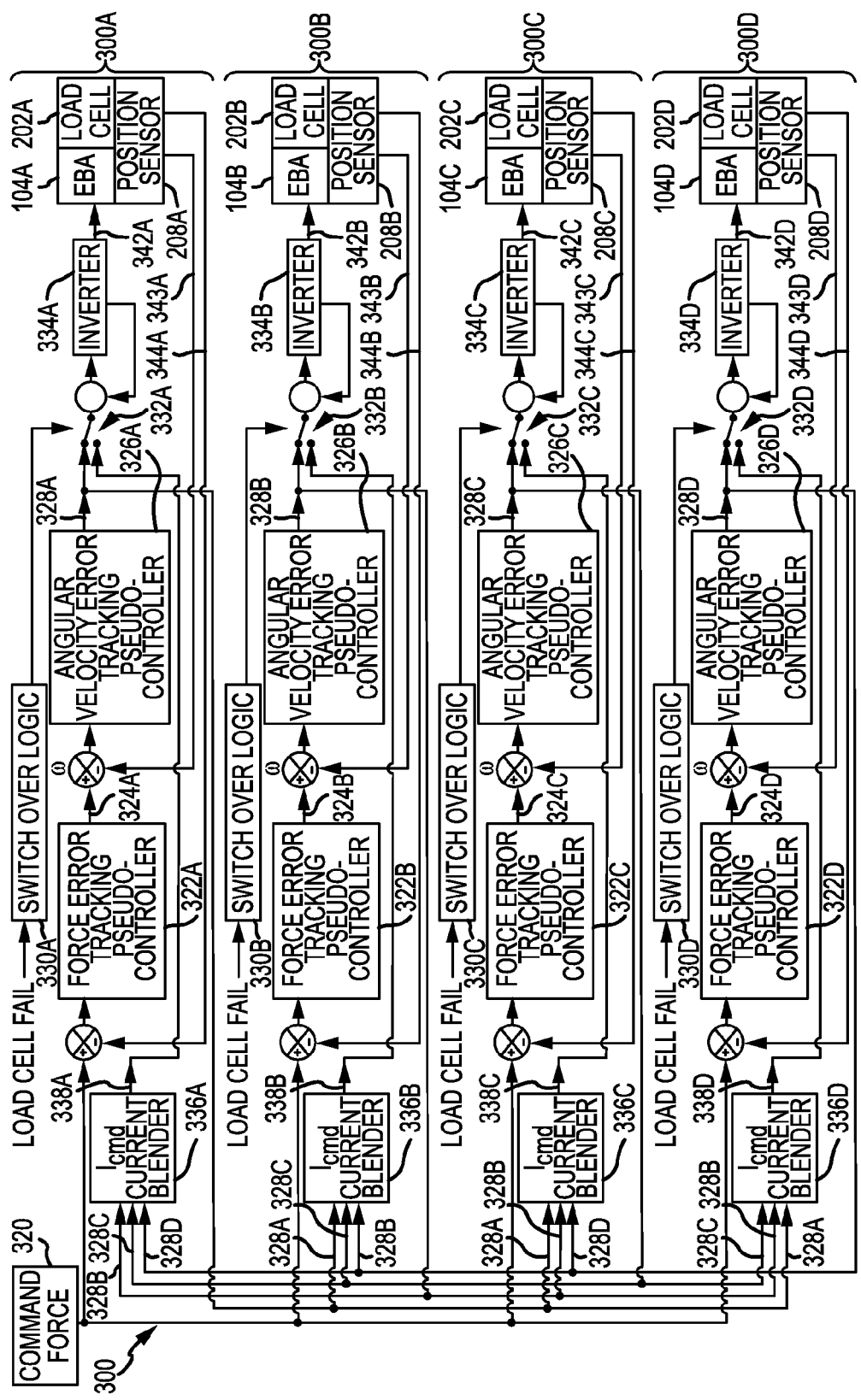
FIG. 3 illustrates a schematic view of a system for multiple brake actuator operation in accordance with various embodiments.

With reference to FIG. 3, elements with like element numbering as depicted in FIG. 1-2, are intended to be the same and will not be repeated for the sake of clarity. For example, load cell 202A is intended to be the same as load cell 202.

FIG. 3 illustrates, in accordance with various embodiments, a system 300 for brake actuator operation with load cell fault tolerant technology (hereinafter "system 300"). In various embodiments, system 300 may comprise a closed-loop system. In various embodiments, system 300 may be implemented in a machine-readable non-transitory medium and performed by a controller. In various embodiments, system 300 may be implemented on a special use controller, field programmable gate array, or the like. In various embodiments, system 300 may be implemented on one or more controllers. In various embodiments, system 300 may comprise an electro-mechanical brake actuator controller (EBAC).

In various embodiments, system 300 may comprise sub-systems 300A, 300B, 300C, and 300D. Sub-systems 300B, 300C, and 300D may be similar to sub-system 300A as described herein.

In various embodiments, system 300 may receive a command force 320. Command force 320 may be sent via an electro-mechanical brake actuator controller (EBAC). Command force 320 may be the force which is being commanded to be applied to an electro-mechanical brake actuator (EBA) in order to apply a braking force to a vehicle such as an aircraft, for example. As previously described, load cell 202A may be configured to measure load cell force 344A. A command force difference may be calculated by summing load cell force 344A and command force 320. The command force difference may be an input to force error tracking pseudo-controller 322A. Force error tracking pseudo-controller 322A may use the command force difference to calculate an angular velocity 324A.

As previously mentioned, position sensor 208A may measure motor angular velocity 343A. An angular velocity difference may be calculated by summing motor angular velocity 343A and angular velocity 324A. In various embodiments, motor angular velocity 343A and angular velocity 324A may comprise values of opposite signs. The angular velocity difference may be an input to angular velocity error tracking pseudo-controller 326A. Angular velocity error tracking pseudo-controller 326A may use the angular velocity difference to calculate command current 328A. Command current 328A may be a normalized current. In various embodiments, the units for command current 328A may be amps per radian per second. Command current 328A may be referred to as a primary command current. For example, if angular velocity 324A comprises a value of ten radians per second (10 rad/s) and motor angular velocity 343A comprises a value of negative four radians per second (−4 rad/s), then summing these two values may yield a value of six radians per second (6 rad/s) which may be an input for angular velocity error tracking pseudo-controller 326A.

Command current 328A may be an input to inverter 334A. Inverter 334A may generate motor current 342A according to command current 328A. Motor current 342A may be a three phase electrical current. Motor current 342A may be an input for the EBA 104A. With reference to FIGS. 1-3, motor current 342A generated by inverter 334A may power actuator motor 102 as previously mentioned. In various embodiments, inverter 334A may be disposed in or adjacent to electromechanical brake actuator 104A, or on or adjacent to actuator motor 102.

With reference again to FIG. 3, in various embodiments, switch 332A may be located between angular velocity error tracking pseudo-controller 326A and inverter 334A. Switch 332A may be configured to switch between command current 328A and secondary command current 338A. Switch 332A may be commanded by switch over logic 330A. In various embodiments, switch over logic 330A may be implemented in a machine-readable non-transitory medium and performed by a controller. In various embodiments, switch over logic 330A may be implemented on a special use controller, field programmable gate array, or the like. In various embodiments, switch over logic 330A may be implemented on one or more controllers. An electro-mechanical brake actuator controller (EBAC) may comprise switch over logic 330A. Switch over logic 330A may be configured to detect a failure of load cell 202A. In the event that load cell 202A fails, load cell force 344A may be inaccurate and, thus, command current 328A may be inaccurate. Therefore, switch over logic may command switch 332A to receive input from current blender 336A instead of angular velocity error tracking pseudo-controller 326A. Accordingly, inverter 334A may generate a three phase electrical current according to secondary command current 338A, which may be an input for the EBA 104A.

With reference to FIGS. 2 and 3, load cell 202A, current sensor 212, and switch over logic 330A may be configured to detect a load cell failure according to various embodiments. As an example, and without exclusivity, if during operation, the motor current 342A, 342B, 342C, and 342D is similar for all load cells 202A, 202B, 202C, and 202D, and load cell forces 344B, 344C, and 344D are similar and load cell force 344A is not similar to load cell forces 344B, 344C, and 344D, it may be determined that load cell 202A has failed.

In various embodiments, current blender 336A may be configured to receive command currents 328B, 328C, and 328D. In various embodiments, current blender 336A may be referred to herein as a signal blender. In various embodiments, current blender 336A may calculate and output at least one of the mean value, median value, modal value, high value, or low value of command currents 328B, 328C, and 328D. In the event that one of command current 328B, 328C, and 328D is associated with a failed load cell, the command current may be detected as erroneous and current blender 336A may be configured to detect the erroneous command current and omit the erroneous command current from its calculations. For example, if load cell 202B is in a failed state and load cell 202C and load cell 202D are operating properly, current blender 336A may omit command current 328B from its calculations and make calculations based solely from command current 328C and 328D. Accordingly, command current 328C, 328D may be referred to herein as an operable load cell command. In the event that load cell 202A fails, switch over logic 330A may command switch 332A to switch from command current 328A to secondary command current 338A. Accordingly, with momentary reference to FIGS. 1-3, secondary command current 338A would be the input for inverter 334A, inverter 334A may generate a secondary motor current, which in turn may power actuator motor 102 as previously described.

Figure 4:
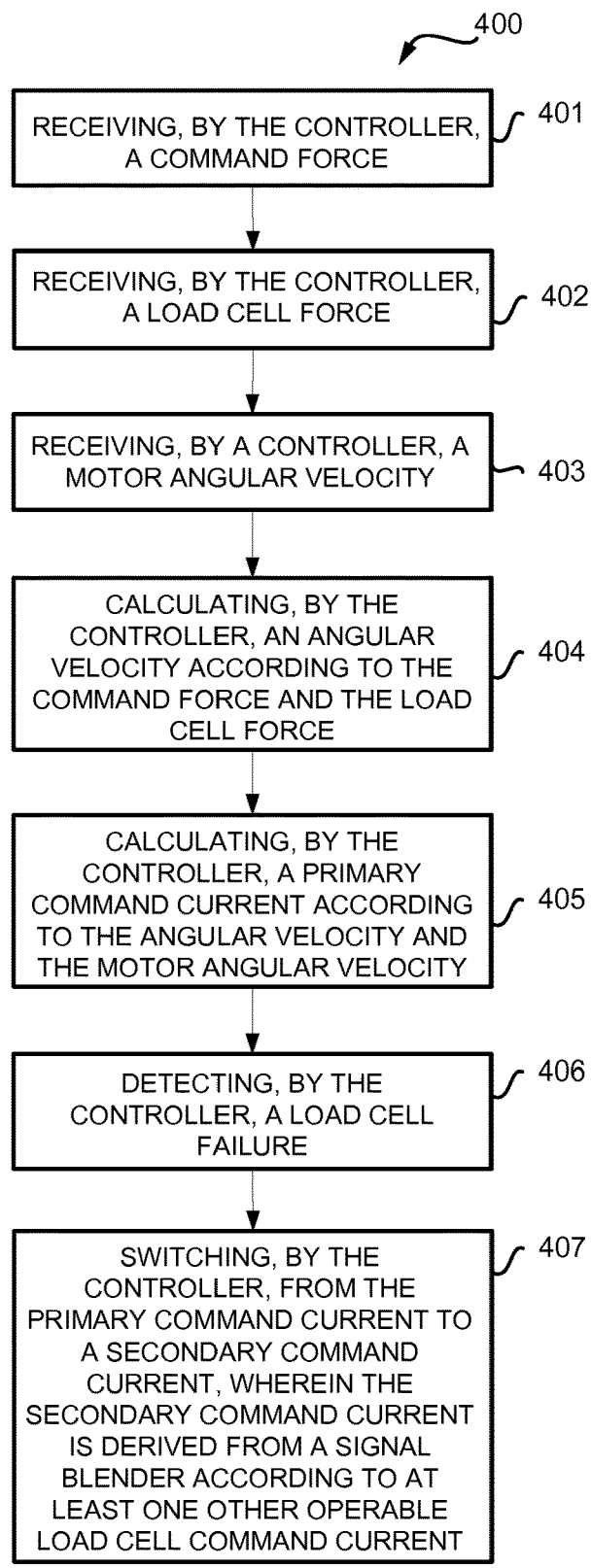
FIG. 4 illustrates a method for operating multiple brake actuators, in accordance with various embodiments.

With reference to FIG. 4, a method of operating multiple brake actuators is described herein in accordance with various embodiments. With reference to FIG. 4, the controller may comprise fault tolerant module 210 of FIG. 2. The method 400 may include receiving, by the controller, a load cell force in step 401, receiving, by a controller, a motor angular velocity in step 402, receiving, by the controller, a command force in step 403, calculating, by the controller, an angular velocity according to the command force and the load cell force in step 404, calculating, by the controller, a primary command current according to the angular velocity and the motor angular velocity in step 405, detecting, by the controller, a load cell failure in step 406, and switching, by the controller, from the primary command current to a secondary command current, wherein the secondary command current is derived from a signal blender according to at least one other operable load cell command current in step 407.

In various embodiments and with further reference to FIG. 3, step 401 may include command force 320 being received by the controller. Step 402 may include the receiving of load cell force 344A, by the controller, from load cell 202A in a manner as previously described. In various embodiments, step 403 may include receiving, by the controller, motor angular velocity 343A from position sensor 208A in a manner as previously described. In various embodiments, step 404 may include the calculating, by the controller, angular velocity 324A in a manner as previously described. In various embodiments, step 405 may include the calculating, by the controller, command current 328A in a manner as previously described. In various embodiments, step 406 may include the detecting, by the controller, of a load cell failure via switch over logic 330A in a manner as previously described. In various embodiments, step 407 may include switching, by the controller, from command current 328A to secondary command current 338A via switch 332A in a manner as previously described.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of operating multiple brake actuators on a brake stack, comprising:
   receiving, by a controller, a command force;
   receiving, by the controller, a load cell force of said brake stack;
   receiving, by the controller, a motor angular velocity;
   calculating, by the controller, a command angular velocity according to the command force and the load cell force of said brake stack;
   calculating, by the controller, a primary command current according to the command angular velocity and the motor angular velocity;
   detecting, by the controller, a load cell failure of said brake stack;
   switching, by the controller, from the primary command current to a secondary command current of the same brake stack, wherein the secondary command current is derived from a signal blender according to at least one other operable load cell command current.

2. The method of claim 1, further comprising:
   sending, by the controller, the secondary command current to an inverter, wherein the inverter is configured to generate a secondary motor current, wherein an electro-mechanical brake actuator (EBA) is in electronic communication with the inverter, the EBA is configured to apply a force to the brake stack according to the secondary motor current.

3. The method of claim 1, wherein at least one of the command force, a second load cell and a position sensor are used to calculate the secondary command current.

4. The method of claim 3, wherein the position sensor comprises at least one of a resolver and a tachometer.

5. The method of claim 1, wherein the signal blender generates the secondary command current according to at least one of the mean, median, mode, highest value, and lowest value of the at least one other operable load cell command current.

6. The method of claim 1, wherein the controller uses the load cell force and a motor current to detect the load cell failure.

7. The method of claim 1, wherein the controller comprises an electro-mechanical brake actuator controller.

8. A system for multiple brake actuator operation, comprising:
   a load cell for a first electro-mechanical brake actuator (EBA), in communication with a controller;

a current sensor, in communication with the controller;

a position sensor, in communication with the controller and configured to measure a rotational speed of a motor shaft; and a tangible, non-transitory memory configured to communicate with the controller, the tangible, non-transitory memory having instructions stored thereon that, in response to execution by the controller, cause the controller to perform operations comprising:

receiving, by the controller, a motor angular velocity;

receiving, by the controller, a load cell force from said load cell;

receiving, by the controller, a command force;

calculating, by the controller, a command angular velocity according to the command force and the load cell force;

calculating, by the controller, a primary command current according to the command angular velocity and the motor angular velocity;

detecting, by the controller, a load cell failure corresponding to the first load cell;

switching, by the controller, from the primary command current to a secondary command current, wherein the secondary command current is derived from a signal blender according to at least a command current corresponding to a second EBA, wherein the first EBA and the second EBA are for a common brake stack.

9. The system for multiple brake actuator operation of claim 8, further comprising:

an inverter; and the first EBA, wherein the first EBA comprises a motor.

10. The system for multiple brake actuator operation of claim 9, wherein the tangible, non-transitory memory causes the controller to perform operations further comprising:

sending, by the controller, the secondary command current to the inverter.

11. The system for multiple brake actuator operation of claim 10, wherein the inverter is configured to generate a secondary motor current, wherein the first EBA is in electronic communication with the inverter, the first EBA configured to apply a force to the common brake stack according to the secondary motor current.

12. The system for multiple brake actuator operation of claim 9, wherein the load cell is in communication with the first EBA, the first EBA further comprising:

the motor shaft, wherein the motor shaft is coupled to the motor, a ball screw, and a ball nut, wherein the ball nut is in communication with the ball screw.

13. The system for multiple brake actuator operation of claim 9, wherein the position sensor comprises at least one of a resolver and a tachometer.

14. The system for multiple brake actuator operation of claim 8, wherein the signal blender generates the secondary command current according to at least one of the mean, median, mode, highest value, and lowest value of the at least one other operable load cell command current.

15. The system for multiple brake actuator operation of claim 8, wherein the controller comprises an electro-mechanical brake actuator controller.

16. A tangible, non-transitory memory configured to communicate with a controller, the tangible, non-transitory memory having instructions stored thereon that, in response to execution by the controller, cause the controller to perform operations comprising:

receiving, by the controller, a command force;

receiving, by the controller, a load cell force from a load cell for a first brake actuator;

receiving, by the controller, a motor angular velocity from a position sensor;

calculating, by the controller, a command angular velocity based upon the command force and the load cell force;

calculating, by the controller, a primary command current according to the command angular velocity and the motor angular velocity;

detecting, by the controller, a load cell failure;

switching, by the controller, from the primary command current to a secondary command current, wherein the secondary command current is derived from a signal blender according to at least a command current corresponding to a second brake actuator, wherein the first brake actuator and the second brake actuator are for a common brake stack.

17. The tangible, non-transitory memory of claim 16, wherein the instructions further comprise:

sending, by the controller, the secondary command current to an inverter, wherein the inverter is configured to generate a secondary motor current, wherein an electro-mechanical brake actuator (EBA) is in electronic communication with the inverter, the EBA is configured to apply a force to the common brake stack according to the secondary motor current.

18. The tangible, non-transitory memory of claim 16, wherein at least one of the command force, a second load cell and the position sensor are used to calculate the secondary command current.

19. The tangible, non-transitory memory of claim 16, wherein the signal blender generates the secondary command current according to at least one of the mean, median, mode, highest value, and lowest value of the at least one other operable load cell command current.

20. The tangible, non-transitory memory of claim 16, wherein the controller comprises an electro-mechanical brake actuator controller and the position sensor comprises at least one of a resolver and a tachometer.

* * * * *